United States Patent [19]
Le Boudec et al.

[11] Patent Number: 5,357,508
[45] Date of Patent: Oct. 18, 1994

[54] CONNECTIONLESS ATM NETWORK SUPPORT USING PARTIAL CONNECTIONS

[75] Inventors: Jean-Yves Le Boudec, Adliswil; Hong L. Truong, Gattikon; Rainer Oechsle, Langnau am Albis, all of Switzerland

[73] Assignee: International Business Machines Corporation, Armonk, N.Y.

[21] Appl. No.: 918,347

[22] Filed: Jul. 22, 1992

[30] Foreign Application Priority Data

Apr. 27, 1992 [EP] European Pat. Off. ......... 92810298.7

[51] Int. Cl.$^5$ .................. H04L 12/50; H04L 12/56
[52] U.S. Cl. .................. 370/58.3; 370/60.1; 370/68.1
[58] Field of Search .......... 370/58.3, 60.1, 60, 370/68.1, 92, 94.1, 53, 58.2

[56] References Cited

U.S. PATENT DOCUMENTS

| | | | |
|---|---|---|---|
| 5,042,029 | 8/1991 | Hayakawa | 370/94.1 |
| 5,163,045 | 11/1992 | Caram et al. | 370/60 |
| 5,185,743 | 2/1993 | Murayama et al. | 370/60 |

FOREIGN PATENT DOCUMENTS

| | | |
|---|---|---|
| 3492589 | 11/1989 | Australia . |
| 0406759 | 1/1991 | European Pat. Off. . |

OTHER PUBLICATIONS

"A Direct ATM Connectionless Service" by J. Y. LeBoudec et al, RACE 1035 (CPN) Temporary Working Document WP3.2/IBM/030.1, Aug. 23, 1991, CH, pp. 1-15.

"A Dynamically Controllable ATM Transport Network Based on the Virtual Path Concept" by S. Ohta et al, IEEE Globecom 88, vol. 3, Nov. 1988, U.S., pp. 1272–1276.

"Packet Forwarding" by W. S. Lai, IEEE Communications Magazine, vol. 26, No. 7, Jul. 1988, U.S. pp. 8–17.

*Primary Examiner*—Benedict V. Safourek
*Attorney, Agent, or Firm*—John J. Timar

[57] ABSTRACT

Method and apparatus for supporting the Asynchronous Transfer Mode (ATM) connectionless service by means of Partial Connections (PCs) in an ATM system (18). These PCs are established between the source users (10, 11, 17) of said ATM system (18) and the destination switching nodes (14) to which the destination users (15) are linked. The use of PCs has no constraints on the size of the domain, because the information the source user (10, 11, 17) inserts in the Virtual Path Identifier/Virtual Channel Identifier (VPI/VCI) field of ATM cells to be transmitted to a destination user (15), is local to the source switching node (12) to which the source user (10, 11, 17) is connected. The information inserted in the VPI/VCI field identifies the PCs along which ATM cells are to be routed.

20 Claims, 7 Drawing Sheets

CONNECTIONLESS ATM NETWORK SUPPORT USING PARTIAL CONNECTIONS

TECHNICAL FIELD

The invention concerns a method and apparatus for supporting the Asynchronous Transfer Mode (ATM) connectionless service in communication systems.

BACKGROUND OF THE INVENTION

The International Telegraph and Telephone Consultative Committee (CCITT) has defined the Asynchronous Transfer Mode (ATM) as the transfer mode for implementing Broadband Integrated Services Digital Networks (B-ISDNs). ATM is based on the use of shod, fixed-length packets called cells. A cell consists of an information field prefixed with a header for routing and control information. The ATM cell structure, having a header portion being 5 octets long and an information field being 48 octets long, is described in "A Direct ATM Connectionless Service", J. Y. Le Boudec et al.. RACE 1035 Temporary Working Document WP3.2/IBM/030.1, 23 Aug. 1991, pp. 1-15.

ATM cells are routed based on the contents of the Virtual Path Identifier (VPI) and Virtual Channel Identifier (VCI) fields in the header of said cell. The VPI/VCI values are used in intermediate switching nodes in conjunction with routing tables to determine the outgoing link on which the cell should be forwarded. They are only valid for the current link and are in general replaced by a new value at the next section. The routing table in any switching node contains an entry for each VPI/VCI value assigned on each incoming link, with the entry providing a mapping to the appropriate outgoing link and the new VPI/VCI value to be used on that link. The assignment of the VPI/VCI values and construction of the routing table entries are carried out as part of a connection setup procedure. Hence, ATM networks provide basically a Connection-Oriented (CO) virtual circuit service.

Different aspects of ATM and its application are described in the following publications:

CCITT Study Group XVIII, Report R34, June 1990, including:
  Draft Recommendation I.121: Broadband aspects of ISDN;
  Draft Recommendation I.150: B-ISDN ATM functional characteristics;
  Draft Recommendation I.311: B-ISDN general network aspects;
"Principles and Benefits of the Asynchronous Transfer Mode", Dupraz et al., Electrical Communication, Vol. 64, No. 2/3, 1990, pp. 116-123;
"The Virtual Path Identifier and Its Application for Routing and Priority of Connectionless and Connection-Oriented Services", J. L. Adams, Int. J. of Digital and Analog Cabled Systems, Vol. 1, No. 4, 1988, pp. 257-262.

A method for supporting the Asynchronous Transfer Mode ConnectionLess (ATM CL) service is disclosed in the European Patent Application EP 91810669.1 with title "Connectionless ATM Data Services" and in its counterpart U.S. application Ser. No. 07/807,359 filed Dec. 16, 1992. In addition, this method is reported on in the working document "A Direct ATM Connectionless Service", J. Y. Le Boudec et al., RACE 1035 Temporary Working Document WP3.2/IBM/030.1, 23, Aug. 1991, pp. 1-15. In this method, every participating terminal (TE) is assigned a Domain Address (D@). The D@ of the destination TE is placed in the VPI/VCI field of the ATM cells by the source TE. The ATM network will then route the ConnectionLess (CL) cells to the destination, based on the Domain Address (D@). For this purpose the D@ is divided into two parts, one for identifying the switching node and the other one for identifying the switching node access port to which the destination TE is attached.

A disadvantage of this ATM CL service is that the Domain Address concept can only be applied to domains with a maximum number of active TEs limited by the size of the D@. This maximum number is namely ca. 64000. Networks with a larger number of terminals have to be partitioned into multiple domains and an additional mechanism is needed for routing the CL cells between these domains.

OBJECTS OF THE INVENTION

The main object of the present invention is to provide a method and apparatus for supporting Asynchronous Transfer Mode Connectionless (ATM CL) service without the constraint of the domain size.

It is a further object of the invention to provide a method and apparatus for supporting ATM CL service which can be implemented by the addition of a few functions and tables in the user terminals, switching nodes and central Management Functions (MFs) of the system.

It is a further object of the present invention to provide for a method and apparatus for supporting ATM CL service which does not require processing of ATM Adaption Layer (AAL) information within the network.

SUMMARY OF THE INVENTION

This has been accomplished by a method and apparatus supporting the ATM connectionless service by means of Partial Connections (PCs), i.e. connections which are established only to the destination switching nodes and not to the destination user itself. Compared to the method supporting ATM connectionless service, described above, the use of partial connections has no constraint on the size of the domain, because the information the source user includes in the VPI/VCI field of a cell is local to the source switching node to which the source terminal is connected. There is no need for inter-domain routing algorithms. This inventive method also allows the switching of the ATM CL cells to lay totally in the ATM layer, thus being transparent to the ATM Adaption Layer (AAL), i.e. avoiding the need for implementing the AAL in the network.

DESCRIPTION OF THE DRAWINGS AND ABBREVIATIONS

The invention is described in detail below with reference to the following drawings.

AAL: Asynchronous Transfer Mode Adaption Layer
ATM: Asynchronous Transfer Mode
B-ISDN: Broadband Integrated Services Digital Network
CCITT: International Telegraph and Telephone Consultative Committee
Cell: The unit of information used by the ATM layer
Connectionless CL/CO bit: Bit in the Virtual Path Identifier/Virtual Channel Identifier (VPI/VCI) field indicating whether the cell is a connectionless of connection oriented cell
D@: Domain Address
E.164: CCITT Recommendation defining addresses for use in the ISDN
EOM: End Of Message
IP: Internet Protocol
ISDN: Integrated Services Digital Network
L@: Location Address
MF: Management Function
MID: Multiplexing Identification
MMX: Message Multiplexing
Netbios: Communication Software (IBM product)
OSI: Open System Interconnection
PC: Partial Connection
$PC_{A\ to\ D}$: Partial Connection between terminal A and D
PCI: Partial Connection Identifier
TE: Terminal

GENERAL DESCRIPTION

Figure 1:
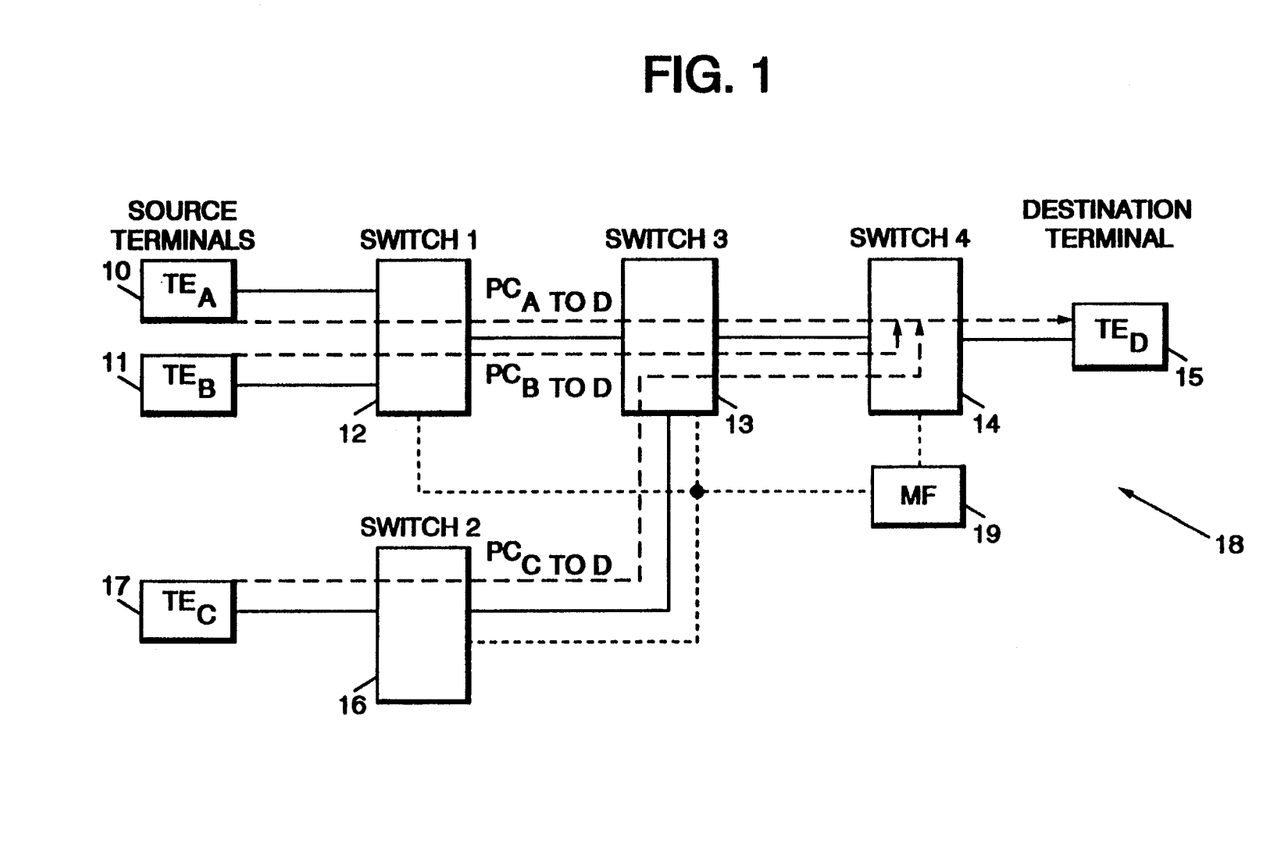
FIG. 1 shows the configuration of an ATM system in which ATM CL service with partial connections, in accordance with the present invention, is supported.
Figure 9:
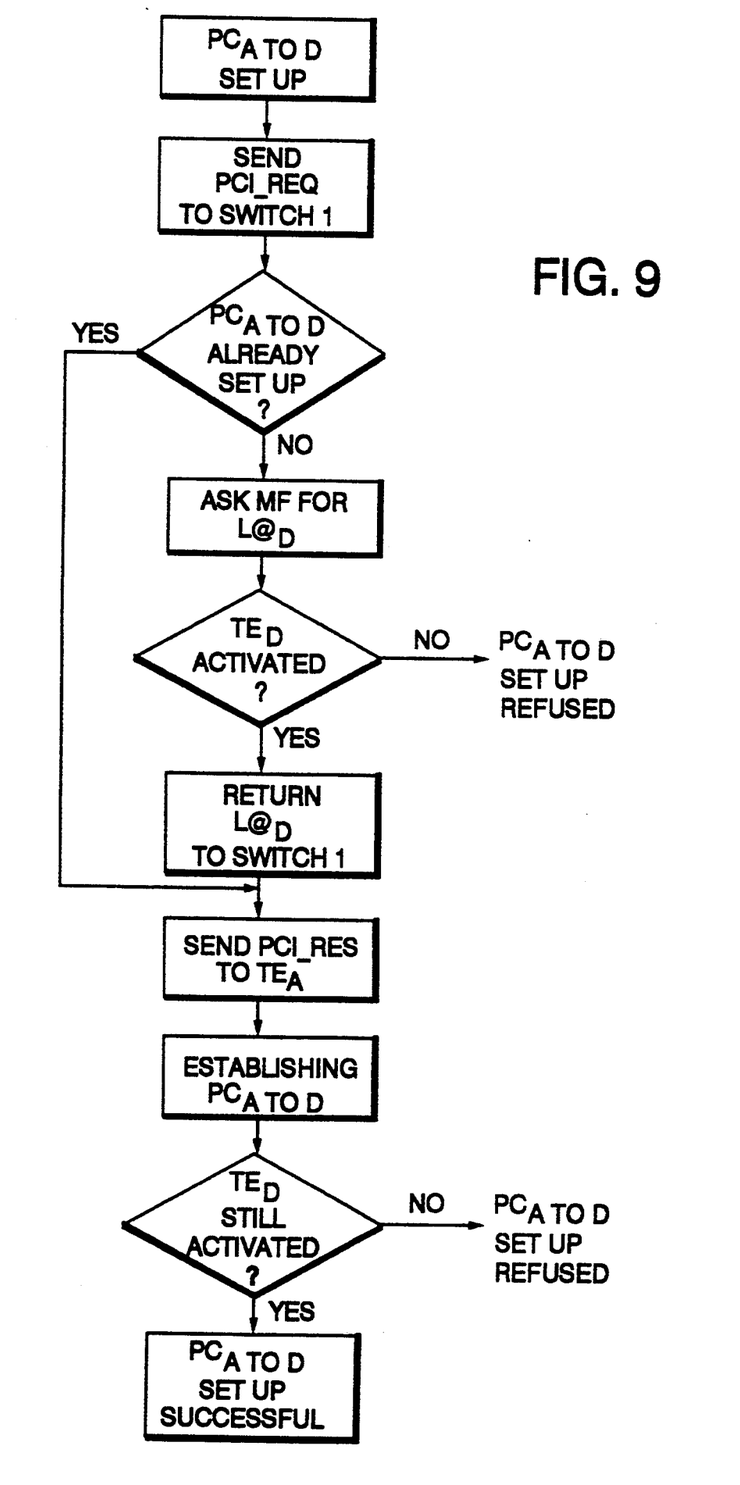
FIG. 9 illustrates a detailed flowchart of the process steps to set up a partial connection with regard to the present invention.

The present method and apparatus are based on so called Partial Connections (PCs). A PC, as illustrated in FIG. 1, is a unidirectional virtual channel connection established by the network 18 from a source TE ($TE_A$) 10 to the destination switching node 14 where the destination TE ($TE_D$) 15 is attached. CL cells send by a source TE, e.g. $TE_A$, contain in their VPI/VCI field a Partial Connection Identifier (PCI), which permits the source switch, e.g. switching node 12, to identify the PC, e.g. $PC_{A\ to\ D}$, over which the cells should be forwarded. Within the network 18, the CL cells will be switched and routed along the PC up to the destination switching node 14. The intermediate switching nodes 12 and 13 switch the cells exactly in the same way as they do for Connection-Oriented (CO) ATM cells, i.e. mapping incoming pod and incoming VPI/VCI into outgoing port and outgoing VPI/VCI. Therefore VPI/VCI mapping tables are setup during the establishment phase of these PCs. A typical mapping table is described in "The Asynchronous Transfer Mode: A Tutorial", J. Y. Le Boudec, Computer Networks and ISDN, May 1992, Volume 24, pages 279-309. FIG. 9 illustrates a detailed flowchart of the steps in the process required to establish the partial connection as discussed above and in the following description as well.

At the destination switching node 14, all PCs directing to the same destination terminal 15 are merged into a single stream, over which the CL cells are sent to the destination TE ($TE_D$) 15. At the merging point where these PCs are merged, Message IDentifier (MID) swapping has to be performed in order to allow the destination terminal to distinguish between the messages issued by different source stations. This MID is a field that ensures that only cells with the same MID are assembled to form one message.

The PCI used by the source TE is totally local to the source access port. Its only means is to help the source switching node to identify the PC which should be used to transfer the CL cells to the destination TE. The function of the PCI is therefore equivalent to that of a VPI/VCI which identifies a virtual connection. For this reason no domain definition is needed such that the inventive method allows the connection of more than 64000 TEs within one domain. Similar to known virtual connections, a PC is also defined between a source TE and a destination TE; however, with the difference that the PC, in accordance with the present invention, terminates in the destination switching node to which the destination TE is linked and not in the destination TE itself, as it is the case for virtual connections.

As illustrated in the exemplary network 18. FIG. 1, the PCI used by $TE_A$ 10 for the cells destined to $TE_D$ 15 provides to the switching node 12 the identification of the partial connection $PC_{A\ to\ D}$. The meaning of this PCI is local to switch 12, to which $TE_A$ 10 is attached. Thus it might have the same value as the PCI used by $TE_B$ 11, although the two terminals 10 and 11 use two different PCs for sending CL cells via the network to $TE_D$ 15. All the PCs destined to $TE_D$ 15 are merged together in switch 14, as already mentioned above.

Activation of a connectionless user (as destination user)

Similar to the activation procedure described in "A Direct ATM Connectionless Service", J. Y. Le Boudec et al., RACE 1035 Temporary Working Document WP3.2/IBM/030.1, 23, Aug. 1991, pp. 1-15, a user 15 who wants to use the CL service, i.e. to receive CL cells, has to send a NOTIFY message to the network 18, i.e the Management Function (MF) 19 thereof. This NOTIFY message contains the higher layer address of the respective user 15 (e.g. Internet Protocol (IP), Open System Interconnection (OSI), E.164 addresses, or Netbios or Internet domain names) and a flag indicating the activation of said destination user 15. The local switching node 14, to which the destination user 15 is attached, responds with a NOTIFY_ACK message containing the VPI/VCI-value the switching node 14 will use for sending CL cells. Furthermore, the local switch 14 informs the Management Function (MF) 19 within the network 18 about the activation of the destination user 15. The MF 19 maintains a table of activated users, which has as entry said higher layer address of each user and the corresponding Location Address (L@) of the access port to which the user is linked. The L@ field contains the information used by the network to setup the PC. The network uses the same information to setup a virtual channel connection to a user. In B-ISDN it is, as specified by the CCITT, based on the E.164 numbering plan. This numbering plan is given in, "Numbering Plan for the ISDN Era", CCITT Recommendation E.164, Fascicle 11.2-Rec. E.164, pp. 135-140.

Requesst of the PCI by the source user

Like the request procedure described in the already mentioned working paper of J. Y. Le Boudec et al., a CL user 10 has to issue a PCI_REQuest message to the network 18 before it can send CL cells via said network 18 to a destination user 15. This message contains the higher layer address of the destination. Upon receipt of this PCI_REQuest message the source switching node 12 checks whether this user 10 has already a PC to that destination 15. If yes, the switch 12 answers with a PCI_RESponse message. This PCI RESponse message contains the PCI value the user 10 should use. Otherwise the switching node 12 asks the MF for the L@ of the destination user 15. With this L@ the source switching node 12 then establishes the PC ($TE_{A\ to\ D}$) to the destination switching node 14. This PC setup will be accepted by the destination switching node 14 if the destination user 15 is still activated (see section: Activation of a connectionless user (as destination user)). If the destination user 15 is not longer activated, the PC setup is refused and the source user 10 may be informed accordingly. In the successful case, i.e. the case when the destination user 15 is still activated, the source user 10 receives the PCI_RES message together with the PCI to be used.

Transfer of CL cells

As described before, a source user 10 sends CL cells to a destination user 15 using the PCI value it has obtained by means of the request procedure (see section: Request of the PCI by the source user). The source switching node 12 uses the PCI value of the CL cells to identify the PC over which it should forward the cells. Within the network 18 the PC is switched in the same way as for a virtual channel connection. The marking of CL cells and PC can for example be performed in the same way as proposed in the European Patent Application EP 91810669.1 with title "Connectionless ATM Data Services", in its counterpart U.S. application Ser. No. 07/807,359, and in "A Direct ATM Connectionless Service", J. Y. Le Boudec et al., RACE 1035 Temporary Working Document WP3.2/IBM/030.1, 23, Aug. 1991, pp. 1-15. It is proposed therein to set the first bit in the VPI/VCI field to one to mark a CL cell and a PC.

In the destination switching node 14 all PCs ($PC_{A\ to\ D}$) directing to the same user 15 are merged together. This is schematically illustrated in FIG. 1, showing that the PCs, $PC_{A\ to\ D}$, $PC_{B\ to\ D}$, $PC_{C\ to\ D}$, are merged together in the destination switching node 14 to which the destination user 15 ($TE_D$) is attached. The CL cells received over these PCs are forwarded by the destination switching node 14 to the destination user 15 using the VPI/VCI value agreed to during the activation phase (see section: Activation of a connectionless user (as destination user)). Since the CL cells of the different PCs might have the same MID value, the destination switch 14 also performs the MID swapping, as discussed in "The Asynchronous Transfer Mode: A Tutorial", J.-Y. Le Boudec, to appear in Computer Networks and ISDN, May 1992.

In applicants' invention, this technique is used as follows. The sending terminal (for example $TE_a$, generates an MID value for every message it sends to a node 12. This MID value needs to be an unambiguous value only on the user's access link, i.e. the user's PC. Within the network 18, each switching node has to decide as to what MID value should be used for outgoing CL cells. The MID value is updated for every frame, based on the incoming MID value and on the outgoing link identifier. The new MID value needs to be unambiguous only on the outgoing link, so no global management of the MID values is requried.

Deactivation and release of the PCs

At the deactivation of a user the network releases all PCs belonging to it. This release of PCs is done independently on whether it is the source or the destination user which is to be deactivated. If, for example, the destination user 15, has to be deactivated all corresponding PCs, i.e. $PC_{A\ to\ D}$, $PC_{B\ to\ D}$, $PC_{C\ to\ D}$, are released. Furthermore, the usage of a PC may be supervised by a timer, i.e. if a PC is not used for a specified time, it automatically will be released by the network. This timer supervisory function could be implemented in the source or in the destination switch and reduces the number of PCs being used.

PCs merging in intermediate switches

As described above, one PC is setup for every pair of source and destination users. This may lead to a very large number of PCs a network has to setup and control. This is caused by the fact that, in accordance with a first implementation and the respective apparatus of the invention, all PCs ($PC_{A\ to\ D}$) directed to a destination user 15 are individually established from the source users 10, 11, and 17 to the destination switching node 15 where all incoming PCs are merged.

In the following a second implementation of the inventive method is described which provides for a reduction of PCs setup in a network. The number of PCs can be reduced considerably if the incoming PCs directed to the same destination user are already merged into single outgoing PC at intermediate switches. This second implementation and an according apparatus are described in connection with FIG. 2. In this figure a network 28 with a MF 29, similar to the one of FIG. 1, is shown, with the difference that all PCs are merged as early as possible. The PCs from source terminals $TE_A$ 20 and $TE_B$ 21 being directed to the same destination TE 25 are merged together in the source switching node 22. By merging these two PCs into one PC, referred to as $PC_{to\ D}$, the number of partial connections of the whole network 28 is reduced. The PC named $PC_{to\ D}$, providing for a connection of $TE_C$ 27 to destination $TE_D$ 25, is merged with $PC_{to\ D}$ coming from switching node 22 in the intermediate switching node 23. By merging the PCs in switches 22 and 23 no further merging is required in destination switching node 24 of the exemplary network 28. At every merging point an MID swapping has to be performed to ensure that, when finally re-assembling the cells, only cells belonging to the same message are re-assembled.

Merging PCs is an optional feature for the switching nodes, i.e. it is up to the respective switching node to decide whether all PCs, some of them, or none of them have to be merged within this switch. The only important issue is that if a merge of PCs is carried out in an intermediate switching node, then this switching node has to perform the MID swapping for these PCs.

Figure 2:
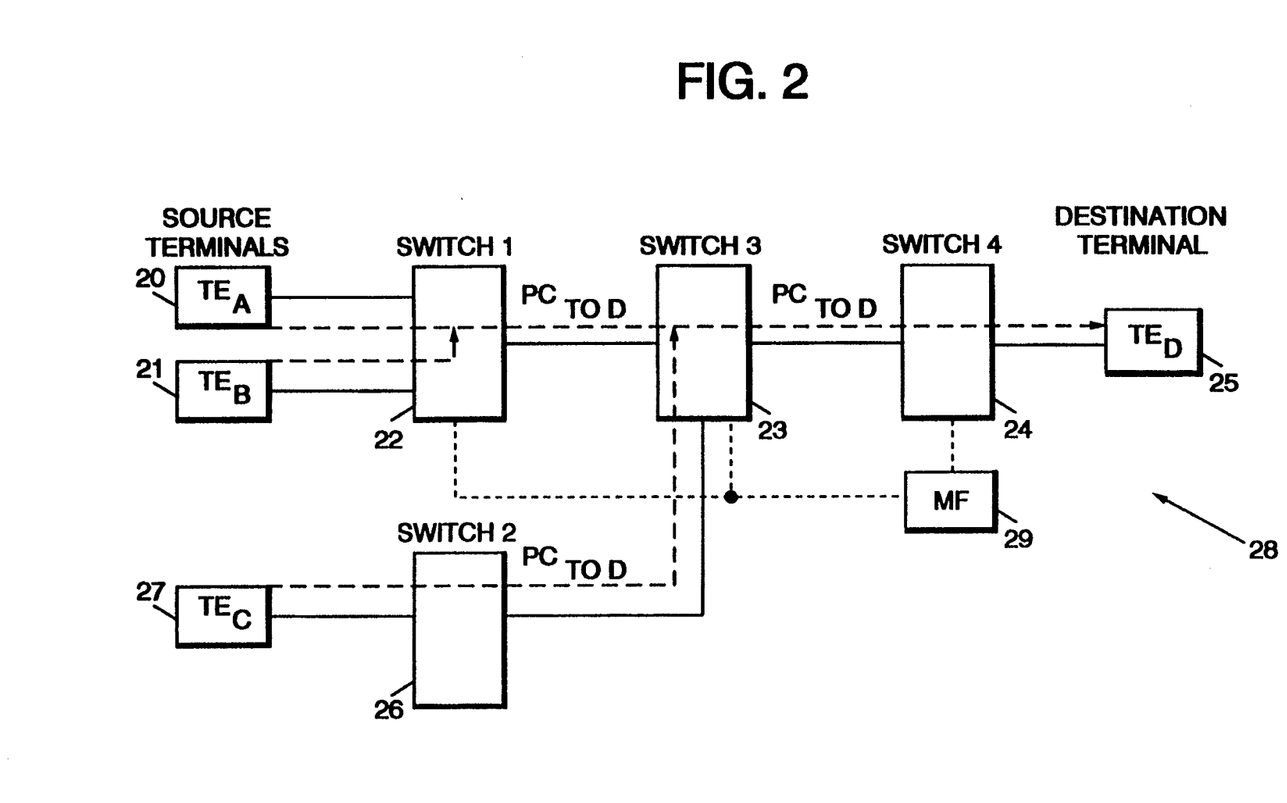
FIG. 2 shows the configuration of another ATM system supporting ATM CL service with partial connections, in accordance with the present invention, wherein PCs are merged in intermediate switching nodes.

By merging the PCs, as illustrated in FIG. 2. a unidirectional tree is established within a network 28. The root of this tree is situated at the destination terminal 25. The PCI defined in context with the description of the first embodiment serves to identify this tree. Every CL cell sent from a source TE, all of them being situated at the leaves of the tree, to the root of said tree, travels along its branch to the next merging point and so forth. At every merging point MID swapping, as explained above, has to be performed.

Virtual path trees

This section describes another embodiment of the invention. As mentioned in context with the description of the second embodiment, the merging of PCs in intermediate switching nodes leads to the formation of a unidirectional tree with the destination terminal situated at the root. The present embodiment of the invention provides for a tree which now ends in the destination switching node and not the destination terminal. In addition, the PCs between the switching nodes are replaced by virtual paths. Thus the amount of trees within a network can be reduced considerably, because there is now one tree per destination switching node and not one tree per destination TE. In addition, the control and management of the trees can now be performed totally independent from the activity of the users. This is not the case for the method in accordance with the second embodiment where the lifetime of the PCs depends on the activity of the source and destination users.

A further difference to the second implementation is that the PCI used by a source TE can be replaced by the D@. This D@ is structured into two parts, as defined in said European Patent Application EP 91810669.1 titled "Connectionless ATM Data Services" and in the already mentioned publication "A Direct ATM Connectionless Service", J. Y. Le Boudec et al., RACE 1035 Temporary Working Document WP3.2/IBM/030.1, 23, Aug. 1991, pp. 1–15. These two parts are:
a first part for the identification of the destination switching node (first implementation) or of the corresponding tree (second implementation), and
the second part for the identification of the user access port.

The first part of the D@ is used by the switches to identify the tree along which the CL cell have to be forwarded, and the second part of the D@ is used by the destination switch for identifying the access port to which the destination TE is attached. In accordance with the second implementation, MID swapping has to be carried out in the merging points of the tree.

AAL transparency

As described in connection with the first three implementations and the corresponding methods supporting connectionless ATM service, MID swapping has to be performed at every merging point. Indeed if two or more incoming PCs use the MID at the same tim, and if the MID is not swapped at the merging points, then the receiver will finally try to re-assemble cells belonging to different messages into one message. Today the MID field is defined in the AAL as described in CCITT Draft Recommendation I.363, "B-ISDN ATM Adaption Layer (AAL) Specification", Geneva, June 1990, p. 99 ff. That means, besides the PC switching which is almost exactly the same as the switching of ATM virtual connections, a second switching level, namely MID swapping, has to be executed at the AAL. Thus the AAL is not transparent to the switches. Any changes in the AAL having an effect on the MID field will lead to a change in the switching nodes. It is therefore an object of the present invention to free the switching nodes from any AAL functions, thus making them invariant from changes in the AAL. The fourth implementation supporting the ATM CL service provides for a means allowing to permit the switching nodes to have an implementation of the CL service which is independent of the AAL.

This fourth implementation is based on the connectionless service supported by partial connections in accordance with the above described methods. Since the PCI used by the source terminal is local to the source access pod, the number of bits required for its coding depends on the number of destinations the user wants to communicate with concurrently, which is small in most cases. The VPI/VCI field is 24 bits long. Ten bits thereof can be reserved for the PCI, thus allowing 1024 concurrent destinations. The remaining bits of the VPI/VCI field can now be used for implementing the message multiplexing identification function. To avoid confusion with the MID function defined in the AAL, this new function of the ATM layer will be referred to as Message Multiplexing (MMX). Note that this MMX function is not a replacement for the AAL MID function, i.e. the users can still use the AAL MID function for their own purposes. The key issue of the fourth implementation is the transparency of the AAL to the switches.

Figure 3:
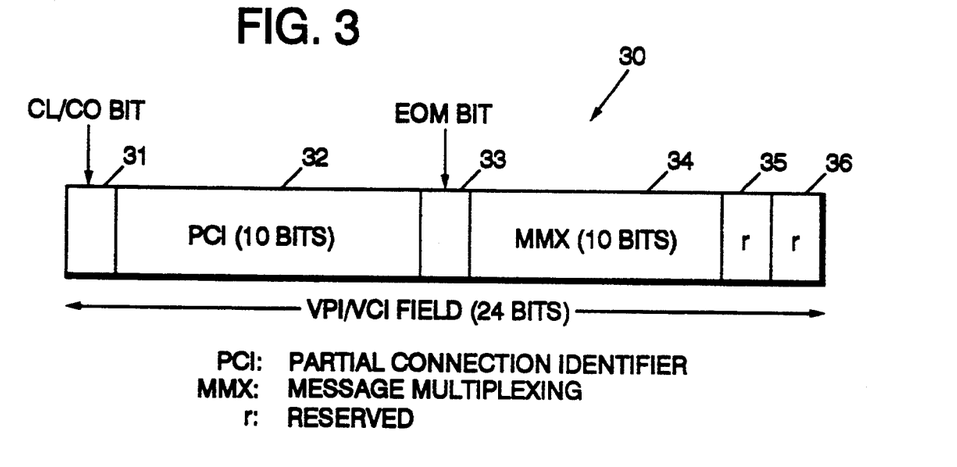
FIG. 3 is the VPI/VCI portion of a CL cell, illustrating the coding of the PCI and MMX fields, in accordance with two implementations of the inventive method.

The resulting structure of the VPI/VCI field of a CL cell is illustrated in FIG. 3, where 10 bits are reserved for the MMX field. Note that FIG. 3 illustrates only an example and that any other number of bits for the PCI and the MMX is possible. The limit is given by the total length of the VPI/VCI field. The first bit 31 of the VPI/VCI field 30, called ConnectionLess/Connection Oriented (CL/CO) bit, indicates whether the cell is a connectionless cell or not. The following field 32, referred to as PCI field, contains 10 bits for the PCI. The MMX field 34, having a length of 10 bits, is reserved for the MMX information. The MMX field 34 is separated from the PCI field 32 by an End Of Message (EOM) bit 33. This EOM bit 33 indicates, if set, that the cell contains the last segment of the message. A similar function is already proposed in "Simple and Efficient Adaptation Layer (SEAL)", ANSI T1S1.5, Doc. T1S1.5/91-292, Source: Sun Microsystems Inc., Aug. 12–16, 1991, with the EOM coded in the Payload Type field of the cell.

In the following sections two methods for the handling of the MMX field are presented.

Dynamic MMX swapping

Similar to the AAL MID function, the source user chooses for every message he wants to transmit an MMX value and includes this value in the MMX field of all CL cells carrying this message. The cell containing the last segment of the message has the EOM bit set to "1". There are no requirements posed to the source user on MMX choice. At the PC merging points in the network, the following MMX swapping procedure is performed for a pair of incoming/outgoing PCs:
Receiving a new MMX and EOM="0": The cell is forwarded with a new and free MMX; the received MMX is stored together with the new outgoing MMX in an MMX table.
Receiving a new MMX and EOM="1": The cell is forwarded with a new and free MMX, which is however freed again for future use.
Receiving an old MMX and EOM="0": The cell is forwarded with the outgoing MMX stored in the MMX table; the received MMX is used as entry to the MMX table.

Receiving an old MMX and EOM="1": The cell is forwarded with the outgoing MMX stored in the MMX table, with the received MMX as entry to the table. The entry is then deleted from the table and the outgoing MMX is freed for future use.

The wording 'old MMX' means that the received MMX already exists as entry in the MMX table. Otherwise, it is a new one. To protect against the loss of cells with EOM="1", the usage of the entries of the MMX tables are supervised by a timer. If this timer runs out, the corresponding entry is deleted and the outgoing MMX is freed for future use. The MMX swapping described above is very similar to the AAL MID swapping. A difference to the MID swapping is that there is no 'Begin of Message'0 (BOM) defined for the identification of a new MMX value.

Static MMX swapping

This second MMX swapping method avoids the permanent updating of the MMX tables and the searching for unused MMX values. The basic idea of this method is illustrated by the merging tree 40 depicted in FIG. 4. This tree 40 shows several sending terminals 41–49 ($TE_1 \ldots, TE_{21}$) which are situated at the leaves of the tree. Several switching nodes 50–55, which merge incoming partial connections into one outgoing partial connection are pad of said tree 40. One receiving terminal $TE_{22}$ 56 is situated at the root of the tree 40. In addition, a weight w is assigned to each switching node 50–55 which indicates that at most $2^w$ incoming partial connections can be merged at this switching node into one outgoing partial connection. Thus a switching node with weight 0, e.g. switching node 53, does not merge at all. A switching node with weight 1 can merge up to two partial connections. Switching nodes 50 and 55 of the exemplary tree 40 have w=1: A requirement is that the height of the merging tree 40 must not exceed the length of the MMX field. This height is defined as maximum weight of all paths from source switching nodes to destination switching nodes. The height of tree 40 is 7. Thus the length of the MMX field must be at least 7.

Figure 4:
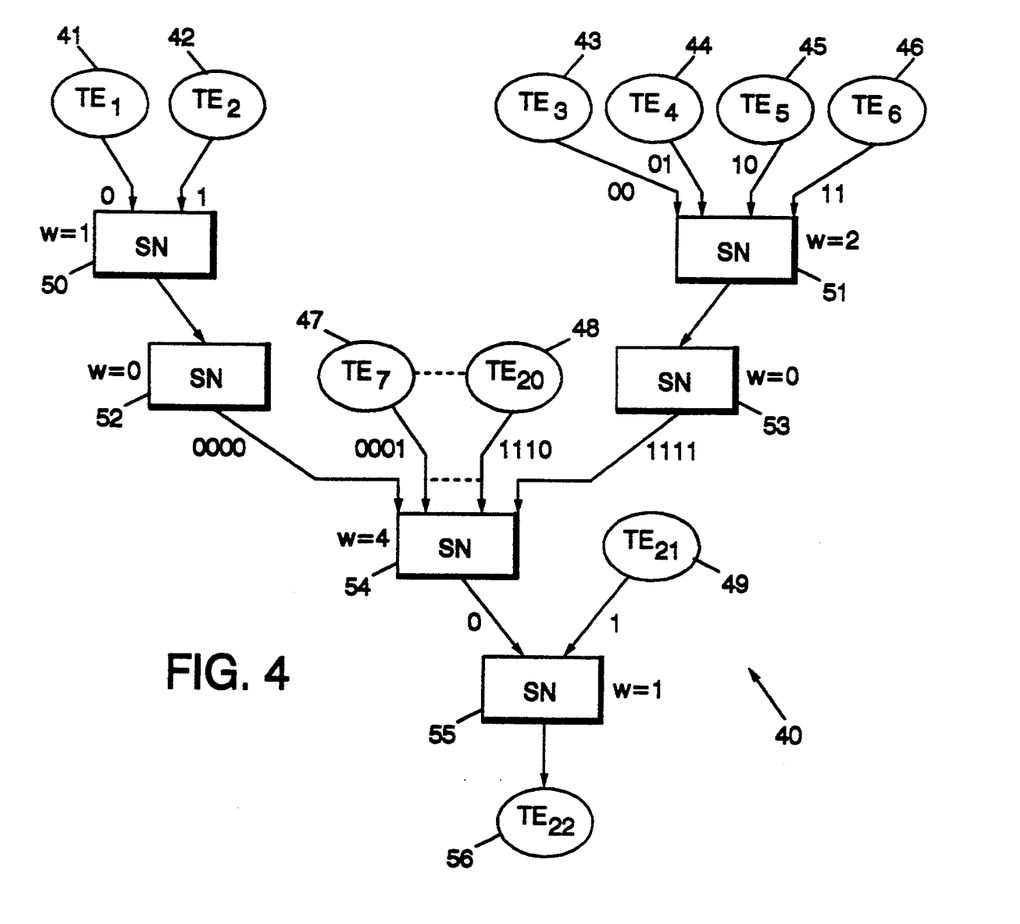
FIG. 4 is a partial connection merging tree, in accordance with an implementation of the present invention.
Figure 5:
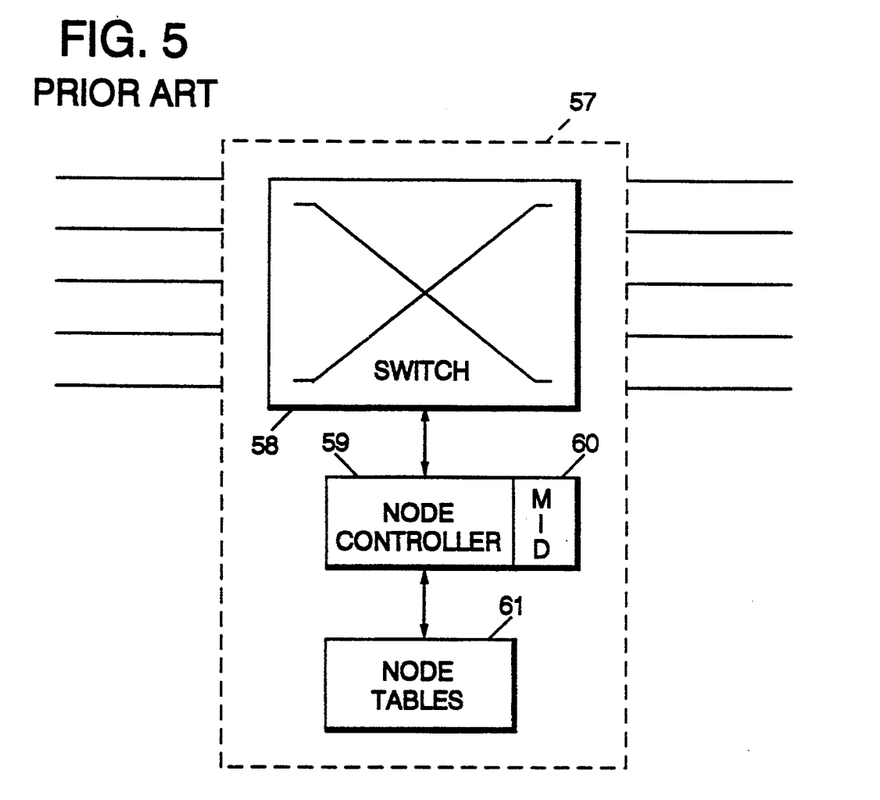
FIG. 5 illustrates a typical known prior art communications switching node such as shown in issued U.S. Pat. No. 5,185,743.
Figure 6:
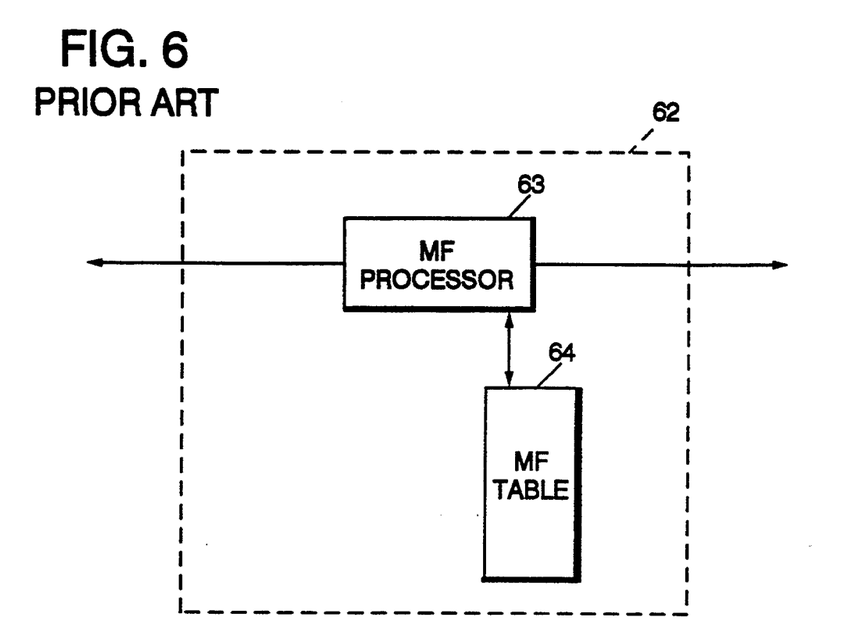
FIG. 6 illustrates a typical prior art management function (MF) node with processor and function table.
Figure 7:
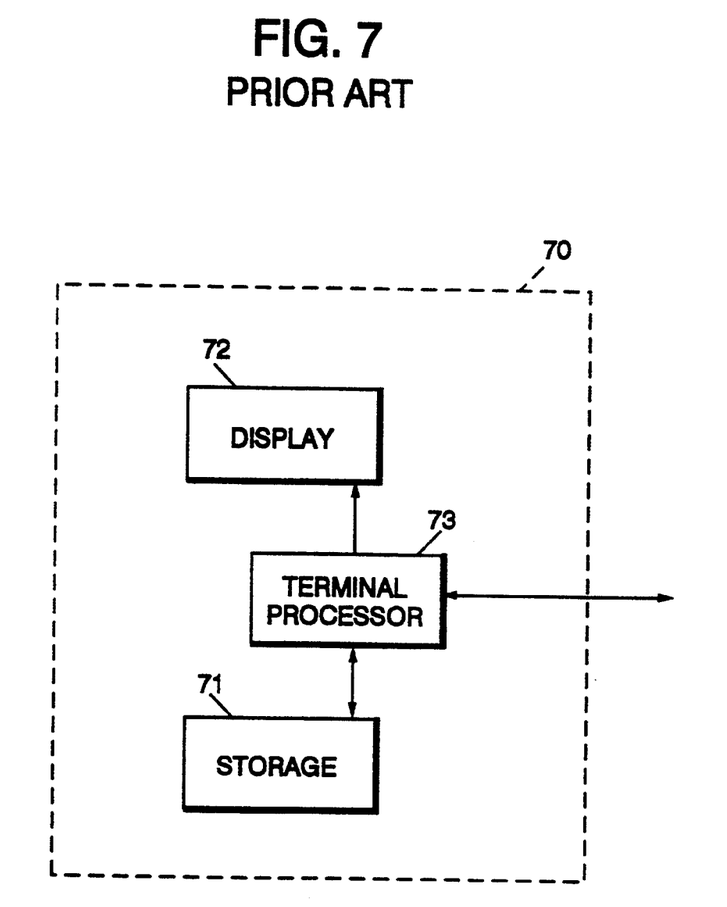
FIG. 7 illustrates a typical prior art terminal having a display, a processor and storage.
Figure 8:
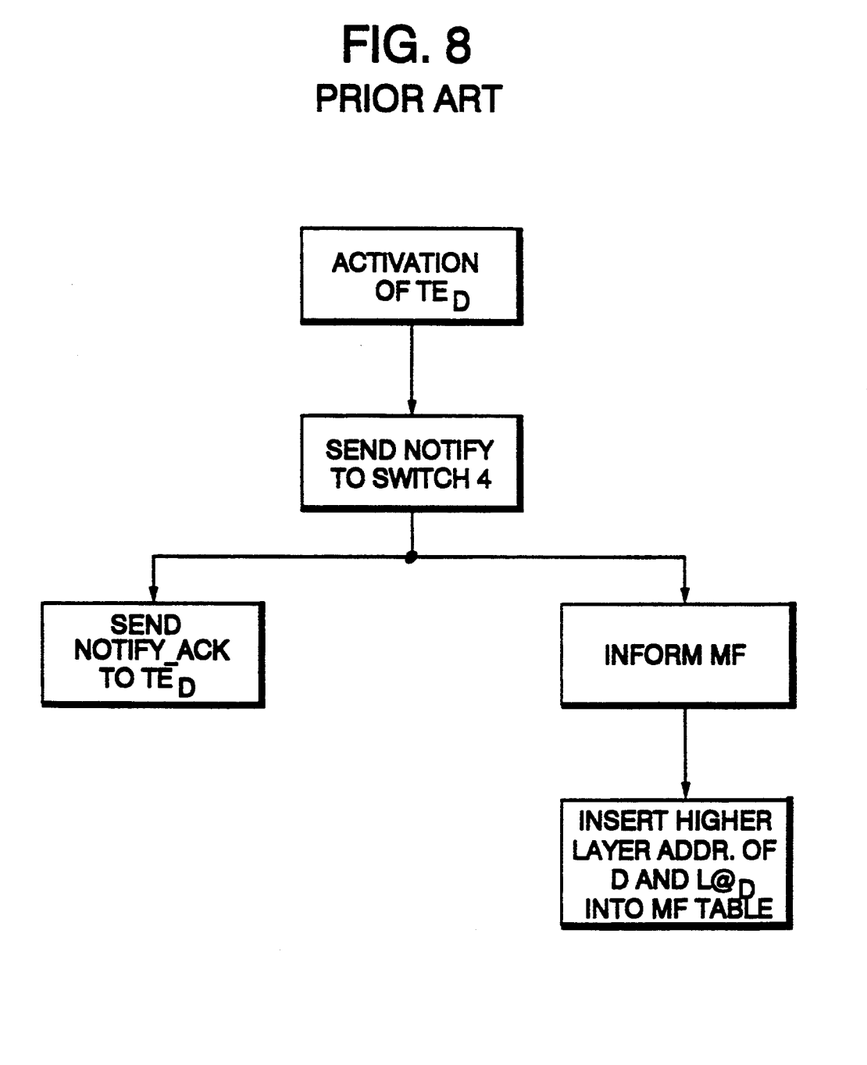
FIG. 8 illustrates the known prior art process for activating a user at a remote terminal.

Each switching node 50–55 assigns numbers in arbitrary order to its incoming partial connections. The numbering starts with 0. Since the maximum number of incoming partial connections is $2^w$, w bits are sufficient for this numbering. For each cell received, the incoming MMX is shifted w bits to the left and the incoming number (between 0 and $2^2-1$) is inserted at the w least significant positions. This procedure can be described by:

$$MMX\_out = MMX\_in \cdot 2^w + No_{incoming\_PC} \quad (1)$$

wherein MMX_out is the MMX value after processing in a switch, MMX-in is the incoming MMX value, and $No_{incoming\_PC}$ is the number assigned to the incoming partial connection. This number is unique within the switch and with respect to the same outgoing partial connection. The same number can be used within this switch when being assigned to incoming partial connections merged into another outgoing PC. By this procedure it is guaranteed that at the receiving terminal cells sent by different terminals carry different MMX values. Different messages can be distinguished by looking, in addition, at the MID field which is transmitted transparently between source and destination terminals.

Referring again to the merging tree 40 in FIG. 4, all messages sent by $TE_5$ 45 are received at $TE_{22}$ 56 With the MMX value x . . . x 10 1111 0. The blanks in this value just separate the different bits inserted by the different switching nodes; x . . . x stands for 'don't care' bit values. By the unique numbering of the incoming PCs of each switching node and by the above described procedure, it is possible to identify all messages sent by a specific user. Another example for a MMX value identifying a message sent from $TE_2$ 42 to $TE_{22}$ 56 transmitted via the switching nodes 50, 52, 54 and 55 reads: x . . . x 1 0000 0. The cells sent by $TE_3$ 43 arrive at $TE_{22}$ 56 with a MMX value x . . . x 00 1111 0 which also is different from other MMX values. The MMX value of cells originating from $TE_{21}$ 49 is changed by the switching node 55 to x . . . x 1 prior to sending them to $TE_{22}$ 56, which is again different from the MMX values written down before. As pointed out, cells of different messages can be separated by looking at the MMX and MID values.

The MMX swapping algorithm is very simple to implement. In addition, the static assignment of MMX values to terminals guarantees that at each merging point a free MMX value is available. Thus for each terminal an MMX value is reserved in the merging tree 40. In large merging trees, this is not necessarily the case when the method for dynamic MMX swapping is applied.

On the other hand, because of the static assignment of MMX values the probability of MMX space exhaustion is higher than for dynamic MMX assignment where the MMX space is exhausted only if there are too many concurrently sent messages at one point in time. Furthermore, during the partial connection setup it has to be checked that the height of the tree does not exceed the length of the MMX field. Another disadvantage of this scheme is the decision to be taken for the assignment of weights to switching nodes.

The two last mentioned disadvantages, namely the check for the maximal height of the tree and the difficulty of weight assignment, disappear, however, if the scheme is applied to special cases. As an example, we consider again the basic implementation of the invention, see FIG. 1, where the merging of the connections only happens at the last switching node 14. In that case one may assign w=0 to all intermediate switching nodes 12, 13 and 16, which do not merge incoming connections, and w=length of the MMX field to the destination switching node 14. In this case, there is no need for checking the height of the merging tree, because the assignment of the weights guarantees that the height of the tree is equal to the length of the MMX field. The merging thus takes place only at the last switching node 14 and each incoming partial connection is assigned a number between 0 and $2^N-1$, where N=length of the MMX field. This number is then used as the MMX value for the outgoing cells to the terminal, no matter what the MMX value of the incoming cell was. When implementing the simple static MMX swapping computation, then there is no need for the EOM bit defined in FIG. 3. This bit can be freed for other uses, e.g. enlarging the MMX field thus allowing merging trees with increased height.

Conclusion

The implementations of the ATM CL service exhibit the following features. The method is based on the use of so-called partial connections (PCs), which can be setup by the network in the same way as for normal virtual connections; the main difference to a virtual connection is that it terminates in the ATM switches and not in the destination terminal. Thus the destination terminal is not aware of these PCs and also not disturbed by the signalling for the control of the PCs. The affinity of PCs to normal virtual connections means that the control, signalling and management procedures developed for normal virtual connections can also be applied for PCs. This is especially advantageous in those networks which are optimized for the support of connection-oriented traffic and where only a relative small subset of terminals is using the CL service and that subset is changing dynamically, e.g. public B-ISDNs.

Another feature of this methods is that the PCIs have only local meaning, i.e. there is no need for a domain definition and consequently also no need for an inter-domain routing mechanism. As further depicted, PCs directing to a specific destination user can be merged into a single one in intermediate switching nodes, leading to the formation of unidirectional trees with destination terminals as tree roots. By merging PCs in intermediate switches the amount of PCs in a network can be reduced.

Another implementation of the inventive method is to have the destination switch instead of the destination TEs as root of the trees. This implementation reduces considerably the amount of trees in the network, reintroduces however the concept of the D@ and consequently the need for the definition of domains and inter-domain routing mechanisms.

Since the PCI fields might be short, it is possible to define a message multiplexing (MMX) function inside the VPI/VCI field of the CL cells, like the MID of the AAL, permits the receiver to re-assemble cells belonging to different messages. Thus this MMX function will release the switching nodes from knowledge of the layers above the ATM layer. This feature is important, especially because it cannot be expected that there will be only one AAL standardized for the connection-less services. The MMX function makes the switches transparent to any AAL, i.e. not affected by changes or modifications of the AAL.

If the basic implementation is used, then it is possible to define a very simple MMX computation in the destination switch. The maximum number of PCs, and consequently the maximum number of source terminals directing to a certain destination terminal is limited to $2^N$, with N being the length of the MMX field.

We claim:

1. A method for transferring connectionless (CL) data messages in an ATM network (18), having a management function (19), said data messages being transmitted in the payload portions of ATM (asynchronous transfer mode) cells having a virtual path identifier/virtual connection identifier (VPI/VCI) field, from an activated source user (10) attached to a source switching node (12) to an activated destination user attached to a destination switching node (14), the method comprising the steps of:

a) establishing a partial connection (PC), i.e. a unidirectional virtual channel connection, from said source user (10) to said destination switching node (14), by said source user (10), before transmitting an ATM cell to said destination user (15), requesting a partial connection identifier (PCI), by sending a request message (PCI-REQuest) to said source switching node (12), said request message comprising the higher layer address of said destination user (15), b) providing the requested partial connection identifier to said source user (10) by sending from said source switching node (12) to said source user (10), a response message (PCI-RESponse,) comprising said requested partial connection identifier which said source user (10) must apply to the virtual path identifier/virtual connection identifier (VPI/VCI) field of said ATM cells, said partial connection identifier being either directly provided by said source switching node in case that said partial connection is already established from said source switching node to said destination switching node and a respective entry is found in a table (61) of said switching node, or said partial connection identifier being requested from the management function (MF, 19) of said ATM network by forwarding said request message to said management function for looking up in a table (64) maintained and controlled by said management function, said table (64) comprising the higher layer addresses of all users being activated and the corresponding location address (L@) of the port to which each said activated user is attached, c) transmitting said ATM cells from said source user to said destination user after receipt of the requested partial connection identifier by inserting said partial connection identifier into the virtual path identifier/virtual connection identifier (VPI/VCI) field of said ATM cells prior to transmitting said ATM cells to said source switching node, d) routing said ATM cells along said partial connection, identified by said partial connection identifier, via said destination switching node to said destination user.

2. The method of claim 1, comprising the step of:
a) deactivating a user, either a destination user or a source user, by releasing all partial connections belonging to it,
either said user itself initiating the deactivation,
or a timer automatically initializing the deactivation if said partial connections have not been used for a predefined time,
said partial connections being released in that all corresponding entries in the table (64) maintained and controlled by said management function and in said table (61) of the switching node to which said user is attached are deleted.

3. The method of claim 1, wherein said source switching node, after receipt of said response message provided by said management function,
a) sets up said partial connection, the setup of this partial connection being accepted by the destination switching node if the destination user is still activated.

4. The method of claim 1, comprising the step of:
a) merging all partial connections directing to the same destination user in said destination switching node prior to routing them to said destination user.

5. The method of claim 1, comprising the steps of:
a) merging all partial connections directed to the same destination user (25) into a single outgoing partial connection (PC$_{to\ D}$) in each intermediate switching node (22, 23), and b) swapping, in said intermediate switching nodes (22, 23), the multiplexing identifiers (MIDs) of said ATM cells carrying the payload of the same message such that these ATM cells can be identified at the destination user by checking their multiplexing identifiers to ensure that only ATM cells with the same multiplexing identifier are re-assembled into one message.

6. The method of claim 1, comprising the step of:

a) establishing a virtual path connection between said source switching node and said destination switching node, this virtual path connection supporting the partial connections between source users attached to said source switching node and destination users attached to said destination switching node, this virtual path connection being independent from the activity of said users.

7. The method of claim 1, comprising the steps of:

a) inserting a message multiplexing (MMX) value (34) by a source user (20) into said virtual path identifier/virtual connection identifier field of ATM cells of a message, said switching node (22), which merges partial connections directed to the same destination user (25) into one outgoing partial connection assigning another, unique message multiplexing value to all ATM cells of the same message, storing said message multiplexing value in a message multiplexing table such that it can be inserted into each incoming ATM cell carrying payload of the same message, freeing said message multiplexing value after receipt and transmittal of the last ATM cell of said message.

8. The method of claim 7, wherein a switching node (22) identifier incoming ATM cells belonging to one message by their message multiplexing value, the ATM cell carrying the last portion of a message being marked setting a flag, i.e. the end of message (EOM) bit (33).

9. The method of claim 8, comprising the steps of:

a) on receipt of an ATM cell with an incoming message multiplexing value which does not exist in said message multiplexing table, its end of message flag not being set (EOM='0'), inserting a new and free outgoing message multiplexing value into the virtual path identifier/virtual connection identifier field of said ATM cell prior to forwarding it, and storing said new outgoing message multiplexing value together with said incoming message multiplexing value in said message multiplexing table;

b) on receipt of an ATM cell with an incoming message multiplexing value which does not exist in said message multiplexing table, its end of message flag being set (EOM='1'). inserting a new and free outgoing message multiplexing value into the virtual path identifier/virtual connection identifier field of said ATM cell prior to forwarding it, and freeing said new outgoing messages multiplexing value for future use;

c) on receipt of an ATM cell with an incoming message multiplexing (MMX) value which already exists in said message multiplexing table, its end of message flag not being set (EOM='0'), inserting the outgoing message multiplexing value, being stored in said message multiplexing table, into the virtual path identifier/virtual connection identifier field of said ATM cell prior to forwarding it, said incoming message multiplexing value being used as entry into said message multiplexing table;

d) on receipt of an ATM cell with an incoming message multiplexing value which already exists in said message multiplexing table, its end of message flag being see (EOM='1'), inserting the outgoing message multiplexing value, being stored in said message multiplexing table, into the virtual path identifier/virtual connection identifier field of said ATM cell prior to forwarding it, said incoming message multiplexing value being used as entry into said message multiplexing table, and deleting the entry from said table and freeing said outgoing message multiplexing value for future use.

10. The method of claim 7, comprising the steps of:

a) assigning numbers (NO$_{incoming\_PC}$) to the incoming partial connections of each switching mode (50, 51, 54, 55) having more than one incoming partial connection, these numbers (NO$_{incoming\_PC}$) being unique within said switching node with respect to one outgoing partial connection, b) assigning a weight w to each switching node (50–55), $2^w$ defining the maximum number of incoming partial connections that can be merged into one outgoing partial connection.

c) assigning an outgoing message multiplexing value (MMX_out) to each ATM cell of one message when routed through a node, this outgoing message multiplexing value being determined by shifting the incoming message multiplexing value (MMX_in) of the incoming message w bits to the left and inserting said number (NO$_{incoming\_PC}$) of the incoming partial connection of a node (50, 51, 54, 55) at the w least significant position of said message multiplexing field being part of the virtual path identifier/virtual connection identifier field of each ATM cell, thereby changing the message multiplexing (MMX) value (34) in each merging switching node (50, 51, 54, 55), whereby this assignment of a message multiplexing value to the ATM cells of each message guarantees that only ATM cells belonging to one message will be reassembled at the destination user (56).

11. An apparatus for transferring connectionless (CL) data messages in an ATM (asynchronous transfer mode) network (18) comprising a plurality of terminals (10, 11, 15, 17), switching nodes (12–14, 16), and a management function unit (19), said data messages being transmitted in the payload portions of ATM cells having a virtual path identifier/virtual connection identifier (VPI/VCI) field, from an activated terminal, i.e. the source terminal (10) attached to a source switching node (12), to an activated terminal, i.e. the destination terminal (15) attached to a destination switching node (14), the apparatus comprising:

a) means for establishing a partial connection, i.e. a unidirectional virtual channel connection, from said source terminal (10) to said destination switching node (14), by said source terminal (10), before transmitting an ATM cell to said destination terminal (15), requesting a partial connection identifier (PCI) by sending a request message (PCI-REQuest) to said source switching node (12), said request message comprising the higher layer address of said destination terminal (15), b) means for providing the requested partial connection identifier (PCI) to said source terminal (10) by sending from said source switching node (12) to said source terminal (10) a response message (PCI-RESponse), comprising said requested partial connection identifier which said source terminal (10) must apply to the virtual path identifier/virtual channel identifier (VPI/VCI) field of said ATM cells,     said partial connection identifier being either directly provided by said source switching node in case that said partial connection is already established from said source switching node to said destination node and a respective entry is found in a table (61) of said switching node, or     said partial connection identifier being requested from said management function unit (19) by forwarding said request message to said management function unit for looking up in a table (64) maintained and controlled by said management function unit, said table (64) comprising the higher layer addresses of all terminals being activated and the corresponding location address (L@) of the port to which each said activated terminal is attached, c) means for transmitting said ATM cells from said source terminal to said destination terminal after receipt of the requested partial connection identifier by inserting said partial connection identifier into the virtual path identifier/virtual connection identifier (VPI/VCI) field of said ATM cells prior to transmitting said ATM cells to said source switching node, d) means for routing said ATM cells along said partial connections, identified by said partial connection identifier, via said destination node to said destination terminal.

12. The apparatus of claim 11, comprising:

a) menas for deactivating a terminal, either a destination terminal or a source terminal, by releasing all partial connections belonging to it.

either said terminal itself initiating the deactivation, or a timer automatically initializing the deactivation it said partial connections have not been used for a predefined time,     said partial connections being released by said means for deactivating a terminal in that all corresponding entries in said table (64) maintained and controlled by said management function unit and it the table (61) of the switching node to which said terminal is attached are deleted.

13. The apparatus of claim 11, comprising means to set up said partial connection in case that said response message has been provided by said management function, the setup of this partial connection being accepted by the destination switching node if the destination terminal is still activated.

14. The apparatus of claim 11, comprising:

a) means for merging all partial connections directing to the same destination terminal in the destination switching node prior to routing them to said destination terminal.

15. The apparatus of any of the claim 11, comprising:

a) means for merging all partial connections directed to the same destination terminal (25) into a single outgoing partial connection (PC $_{to\ D}$) in each intermediate switching node (22, 23). and b) swapping, in said intermediate switching nodes (22, 23), the multiplexing identifiers (MIDs) of said ATM cells carrying the payload of the same message such that these ATM cells can be identified at the destination terminal by checking their multiplexing identifiers to ensure that only ATM cells with the same multiplexing identifier are re-assembled into one message.

16. The apparatus of claim 11, comprising:

a) means for establishing a virtual path connection between said source switching node and said destination switching node, this virtual path connection supporting the partial connections between source terminals attached to said source switching node and destination terminals attached to said destination switching node, this virtual path connection being independent from the activity of said terminals.

17. The apparatus of claim 11, comprising:

a) means for inserting a message multiplexing (MMX) value (34) by a source terminal (20) into said virtual path identifier/virtual connection identifier field of ATM cells of a message, said switching node (22), which merges partial connections directed to the same destination terminal (25) into one outgoing partial connection b) means for assigning another, unique message multiplexing value to all ATM cells of the same message, c) means for storing said message multiplexing value in a message multiplexing table such that it can be inserted into each incoming ATM cell carrying payload of the same message, d) means for freeing said message multiplexing value after receipt and transmittal of the last ATM cell of said message.

18. The apparatus of claim 17, wherein a switching node (22) comprises means for identifying incoming ATM cells belonging to one message by their message multiplexing value, the ATM cell carrying the last portion of a message being marked setting a flag, i.e. the end of message (EOM) bit (33).

19. The apparatus of claim 18, comprising:

a) means for inserting, on receipt of an ATM cell with an incoming message multiplexing value which dose not exist in said message multiplexing table, its end of message flag not being set (EOM='0'), new and free outgoing message multiplexing value into the virtual path identifier/virtual connection identifier field to said ATM cell prior to forwarding it, b) means for storing said new outgoing message multiplexing value together with said incoming message multiplexing value in said message multiplexing table;

c) means for inserting, on receipt of an ATM cell with an incoming message multiplexing value which does not exist in said message multiplexing table, its end of message flag being set (EOM='1'), a new and free outgoing message multiplexing value into the virtual path identifier/virtual connection identifier field of said ATM cell prior to forwarding it, d) means for freeing said new outgoing message multiplexing value for future use;

e) means for inserting, on receipt of an ATM cell with an incoming message multiplexing value which already exists in said message multiplexing table, its end of message flag not being set (EOM='0'), the outgoing message multiplexing value, being stored in said message multiplexing table, into the virtual path identifier/virtual connection identifier field of said ATM cell prior to forwarding it, said incoming message multiplexing value being used as entry into said message multiplexing table;

f) means for inserting, on receipt of an ATM cell with an incoming message multiplexing value which already exists in said message multiplexing table, its end of message flag being set (EOM='1'), the outgoing message multiplexing value, being stored in said message multiplexing table, into the virtual path identifier/virtual connection identifier field of said ATM cell prior to forwarding it, said incoming message multiplexing value being used as entry into said message multiplexing table, and deleting the entry from said table and freeing said outgoing message multiplexing value for future use.

20. The apparatus of claim 17, comprising:

a) means for assigning numbers (No$_{incoming\_PC}$) to the incoming partial connections of each switching (50, 51, 54, 55) having more than one incoming partial connection, these numbers (NO$_{incoming\_PC}$) being unique within said switching node with respect to one outgoing partial connection, b) means for assigning a weight w to each switching node (50-55), $2^w$ defining the maximum number of incoming partial connections that can be merged into one outgoing partial connection, c) means for assigning an outgoing message multiplexing value (MMX_out) to each ATM cell of one message when routed through a switching node, this outgoing message multiplexing value (MMX_out) being determined by shifting the incoming message multiplexing value (MMX_in) of the incoming message w bits to the left and inserting said number (No$_{incoming\_PC}$) of the incoming partial connection of a switching node (50, 51, 54, 55) at the w least significant position of said message multiplexing field being part of the virtual path identifier/virtual connection identifier field of each cell, thereby changing the message multiplexing value in each merging switching node (50, 51, 54, 55), such that this assignment of a message multiplexing value to the ATM cells of each message guarantees that only ATM cells belonging to one message will be reassembled at the destination terminal (56).

* * * * *